(12) United States Patent
Okada et al.

(10) Patent No.: US 10,443,459 B2
(45) Date of Patent: Oct. 15, 2019

(54) OIL FILTER ATTACHING STRUCTURE FOR VEHICLE-MOUNTED INTERNAL COMBUSTION ENGINE

(71) Applicant: HONDA MOTOR CO., LTD., Tokyo (JP)

(72) Inventors: Nozomi Okada, Wako (JP); Hiroto Takeichi, Wako (JP); Isao Azumagakito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 15/699,932

(22) Filed: Sep. 8, 2017

(65) Prior Publication Data

US 2018/0087417 A1 Mar. 29, 2018

(30) Foreign Application Priority Data

Sep. 27, 2016 (JP) .................................. 2016-188732

(51) Int. Cl.
*F01M 11/03* (2006.01)
*B62J 99/00* (2009.01)
(Continued)

(52) U.S. Cl.
CPC .............. *F01M 11/03* (2013.01); *B62J 99/00* (2013.01); *B62K 11/04* (2013.01);
(Continued)

(58) Field of Classification Search
CPC .... F01M 11/03; F01M 11/0004; F01M 11/02; F01M 2011/0029; F01M 2011/031; B62J 99/00; B62K 11/04; B65D 51/1616; F02B 61/02; F02B 75/06; F02F 7/0073; F02F 2007/0075
See application file for complete search history.

(56) References Cited

U.S. PATENT DOCUMENTS

2003/0098203 A1\* 5/2003 Kunimitsu ............... F01M 1/08
184/6.5
2004/0104075 A1\* 6/2004 Ito .......................... F01M 5/002
184/6.5
(Continued)

FOREIGN PATENT DOCUMENTS

JP          4-76209 A      3/1992
JP      2004-132362 A      4/2004
(Continued)

OTHER PUBLICATIONS

Extended European Search Report for European Application No. 17186658.5, dated Feb. 20, 2018.

*Primary Examiner* — Michael A Riegelman
(74) *Attorney, Agent, or Firm* — Birch, Stewart, Kolasch & Birch, LLP

(57) ABSTRACT

In an oil filter attaching structure for a vehicle-mounted internal combustion engine, an oil filter of the engine is installed in a filter case integrally formed with a crankcase cover of a crankcase. The crankcase cover is mounted on a side surface of the crankcase so as to cover an end of a crankshaft supported by the crankcase to extend in vehicle widthwise directions. An internal combustion engine accessory and a transmission clutch device are disposed inside of the crankcase cover in respective positions forward and rearward of the crankshaft. The oil filter and an oil supply port are disposed inside of the crankcase cover in respective positions upward and downward of the crankshaft. The oil filter attaching structure efficiently utilizes the space for making itself smaller in size and for better maintainability.

10 Claims, 10 Drawing Sheets

(51) Int. Cl.

| | | |
|---|---|---|
| *B65D 51/16* | (2006.01) | |
| *F01M 11/00* | (2006.01) | |
| *F02F 7/00* | (2006.01) | |
| *F02B 61/02* | (2006.01) | |
| *F02B 75/06* | (2006.01) | |
| *B62K 11/04* | (2006.01) | |
| *B60K 17/02* | (2006.01) | |
| *F01M 11/02* | (2006.01) | |

(52) U.S. Cl.
CPC ..... *B65D 51/1616* (2013.01); *F01M 11/0004* (2013.01); *F02B 61/02* (2013.01); *F02B 75/06* (2013.01); *F02F 7/0073* (2013.01); *B60K 17/02* (2013.01); *F01M 11/02* (2013.01); *F01M 2011/0029* (2013.01); *F01M 2011/031* (2013.01); *F02F 2007/0075* (2013.01)

(56) References Cited

U.S. PATENT DOCUMENTS

| | | | | |
|---|---|---|---|---|
| 2005/0107194 | A1* | 5/2005 | Oishi | F01M 11/02 474/28 |
| 2005/0217633 | A1* | 10/2005 | Uneta | F02M 35/04 123/198 E |
| 2008/0028630 | A1* | 2/2008 | Cho | G01F 23/04 33/726 |
| 2008/0096718 | A1 | 4/2008 | Oishi et al. | |
| 2009/0084633 | A1* | 4/2009 | Fujimoto | F01M 1/10 184/6.5 |
| 2010/0024761 | A1* | 2/2010 | Yasui | F01M 1/12 123/196 R |
| 2014/0026844 | A1* | 1/2014 | Yamashiro | F02B 77/00 123/198 R |
| 2018/0087417 | A1* | 3/2018 | Okada | B62K 11/04 |
| 2018/0087437 | A1* | 3/2018 | Okada | F01M 1/02 |
| 2018/0087471 | A1* | 3/2018 | Okada | F02F 7/006 |
| 2018/0283243 | A1* | 10/2018 | Okada | F01M 9/105 |
| 2018/0283506 | A1* | 10/2018 | Okada | F01L 1/022 |
| 2018/0283528 | A1* | 10/2018 | Tanaka | F02B 61/06 |

FOREIGN PATENT DOCUMENTS

| | | |
|---|---|---|
| JP | 2008-19877 A | 1/2008 |
| JP | 2008-38655 A | 2/2008 |
| JP | 2009-162194 A | 7/2009 |

* cited by examiner

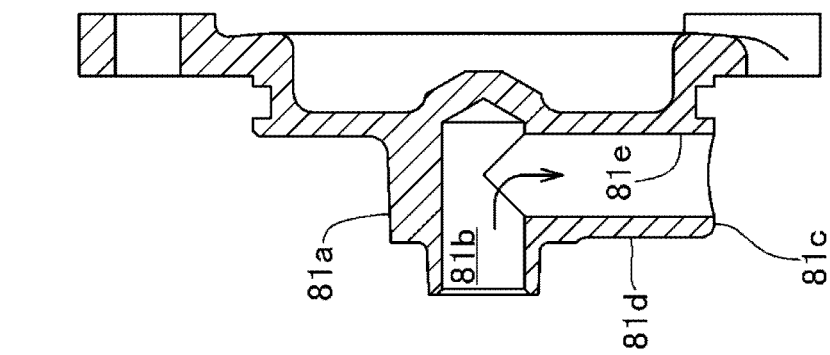
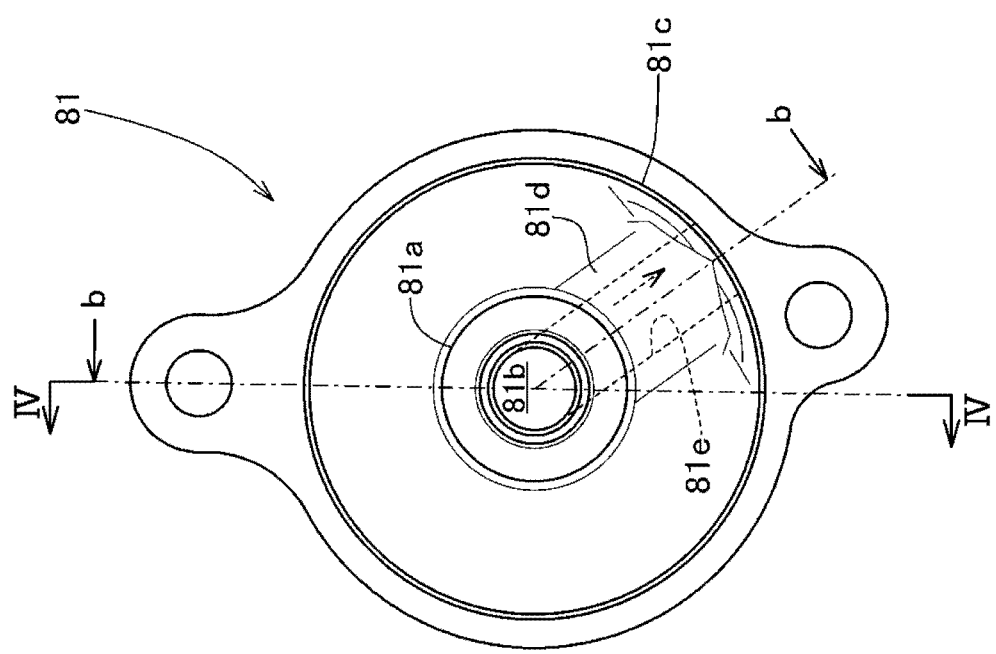

OIL FILTER ATTACHING STRUCTURE FOR VEHICLE-MOUNTED INTERNAL COMBUSTION ENGINE

TECHNICAL FIELD

The present invention relates to an oil filter attaching structure for a vehicle-mounted internal combustion engine which has a reduced space for installing an oil filter.

BACKGROUND ART

Patent Document 1, indicated below, discloses a vehicle wherein an oil filter for a vehicle-mounted internal combustion engine is installed in a filter case that is integrally formed with a case cover of a crankcase. The vehicle disclosed in Patent Document 1 is a rough-terrain four-wheel drive (4WD) vehicle. Some vehicle-mounted internal combustion engines for saddle-type vehicles or the like are smaller in size and challenged by the task of securing an oil filter space.

PRIOR ART DOCUMENT

Patent Document

[Patent Document 1]
JP 2004-132362 A (FIGS. 4, 6, and 19)

SUMMARY OF THE INVENTION

Problems to be Solved by the Invention

The present invention has been made in view of the above prior art. It is an object of the present invention to provide an oil filter attaching structure for a vehicle-mounted internal combustion engine in which an oil filter is installed by a filter case integrally formed with a crankcase cover of a crankcase, the internal combustion engine having a side surface efficiently utilized for making itself smaller in size and for better maintainability.

Means For Solving the Problems

To solve the above task, there is provided in accordance with the present invention an oil filter attaching structure for a vehicle-mounted internal combustion engine, in which the internal combustion engine has an oil filter installed in a filter case integrally formed with a crankcase cover of a crankcase, wherein: the crankcase cover is mounted on a side surface of the crankcase so as to cover an end of a crankshaft supported by the crankcase so as to extend in vehicle widthwise directions; an internal combustion engine accessory and a clutch device of an engine transmission are disposed inside of said crankcase cover in respective positions forward and rearward of the crankshaft; and the oil filter and an oil supply port are disposed in said crankcase cover in respective positions upward and downward of the crankshaft.

With the above arrangement, the internal combustion engine accessory, the transmission clutch device, the oil filler port, and the oil filter are distributed at respective positions forward, rearward, upward, and downward of the crankshaft on the crankcase cover mounted on the side surface of the crankcase in covering relation to the end of the crankshaft. Therefore, the internal combustion engine has a side surface efficiently utilized for making itself smaller in size and for better maintainability.

In a preferred embodiment of the invention, the filter case includes therein a storage cavity having a bottomed tubular shape defined in the crankcase cover and extending toward a center region of the vehicle in a direction along the crankshaft; and the oil filter is housed in the storage cavity with a cap covering the storage cavity.

With this arrangement, since the oil filter is housed in the storage cavity that protrudes into the crankcase cover, the cap is positioned closely to the center of the engine and prevented from protruding from the crankcase cover. Therefore, even the vehicle-mounted internal combustion engine which is small in size provides a space for the oil filter, and has its width reduced.

In a preferred embodiment of the invention, a first oil passage and a second oil passage are provided in a wall of the crankcase cover along an inner wall surface thereof, so as to open at an inner circumferential surface of the storage cavity, the cap has an inner cap oil passage defined therein radially outward from an inner cap central space defined in the cap, and the inner cap oil passage is open at an outer circumferential surface of the cap and is in communication with the second oil passage.

With this arrangement, inasmuch as the first and second oil passages that are connected to the storage cavity do not extend parallel to the crankshaft, but are defined in the wall of the crankcase cover along the inner wall surface thereof, no space for defining oil passages therein is required along the axis of the crankshaft. Therefore, the oil filter is positioned closely to the crankshaft, allowing the internal combustion engine to be reduced in size.

In a further preferred embodiment of the invention, the oil filter is housed in the storage cavity so as to divide the space in the storage cavity into a peripheral space and a central space, the peripheral space is held in fluid communication with the first oil passage, and the central space is held in fluid communication with the second oil passage through the inner cap central space and the inner cap oil passage in the cap.

With this arrangement, both the first oil passage and the second oil passage, which serve as an inlet flow path and an outlet flow path for the oil filter, are disposed in a planar layout, and are hence prevented from protruding from the crankcase cover.

In a still further embodiment of the invention, the storage cavity has on an inner bottom surface thereof a cylindrical guide boss for positioning a helical spring for pressing the oil filter toward the cap.

With this arrangement, the helical spring is prevented from being moved by the guide boss and is positioned securely with ease, and the oil filter can be assembled efficiently.

In a preferred embodiment of the invention, the storage cavity has an outer bottom surface which is of a shape protruding toward the crankcase beyond a mating surface of the crankcase cover for being mated to the crankcase.

With this arrangement, when the crankcase cover is removed from the crankcase member and placed on a tray for putting component parts thereon, with the mating surface facing down, the mating surface is kept off the bottom surface of the tray. The mating surface is thus prevented from being damaged and has its serviceability increased.

In an embodiment of the invention, the internal combustion engine has a balancer drive gear and a balancer driven gear, which are supported by the crankcase with their respective axes parallel to the crankshaft and held in mesh with each other, on the same axial side as the end of the crankshaft; and the storage cavity of the crankcase cover is disposed in a position partly overlapping the balancer drive gear and the balancer driven gear as viewed in a direction along the crankshaft.

With this arrangement, the storage cavity is placed in a space at the axial ends of the large-diameter balancer gear train disposed on the same axial side as the end of the crankshaft and having respective axes extending parallel to the crankshaft. The internal combustion engine is thus allowed to be reduced in size.

Effects of the Invention

With the oil filter attaching structure for a vehicle-mounted internal combustion engine according to the present invention, the internal combustion engine accessory, the clutch device, the oil supply port, and the oil filter are distributed at respective positions forward, rearward, upward, and downward of the crankshaft on the crankcase cover that is mounted on the side surface of the crankcase in covering relation to the end of the crankshaft. Therefore, the internal combustion engine has a side surface efficiently utilized for making itself smaller in size and for better maintainability.

BRIEF DESCRIPTION OF THE DRAWINGS

FIG. 5 (a) is a view taken along line V-V of FIG. 4, and FIG. 5 (b) is a cross-sectional view taken along line b-b of FIG. 5 (a), line IV-IV in FIG. 5 (a) indicating a section plane in FIG. 4;

MODE FOR CARRYING OUT THE INVENTION

An oil filter attaching structure for a vehicle-mounted internal combustion engine according to an embodiment of the present invention will be described below with reference to the drawings.

Directions such as forward, rearward, leftward, rightward, upward, and downward directions referred to in the description and claims that follow are in accord with those of a vehicle which incorporates therein the internal combustion engine having the oil filter attaching structure according to the present embodiment. In the present embodiment, the vehicle refers to a saddle-type vehicle that specifically includes a motorcycle 1 illustrated in FIG. 1.

In the figures, the arrow FR represents a forward direction of the vehicle, the arrow LH a leftward direction, the arrow RH a rightward direction, and the arrow UP an upward direction.

In the figures, the unnumbered small arrows indicate flows of oil in the internal combustion engine having the oil filter attaching structure according to the present embodiment.

Figure 1:
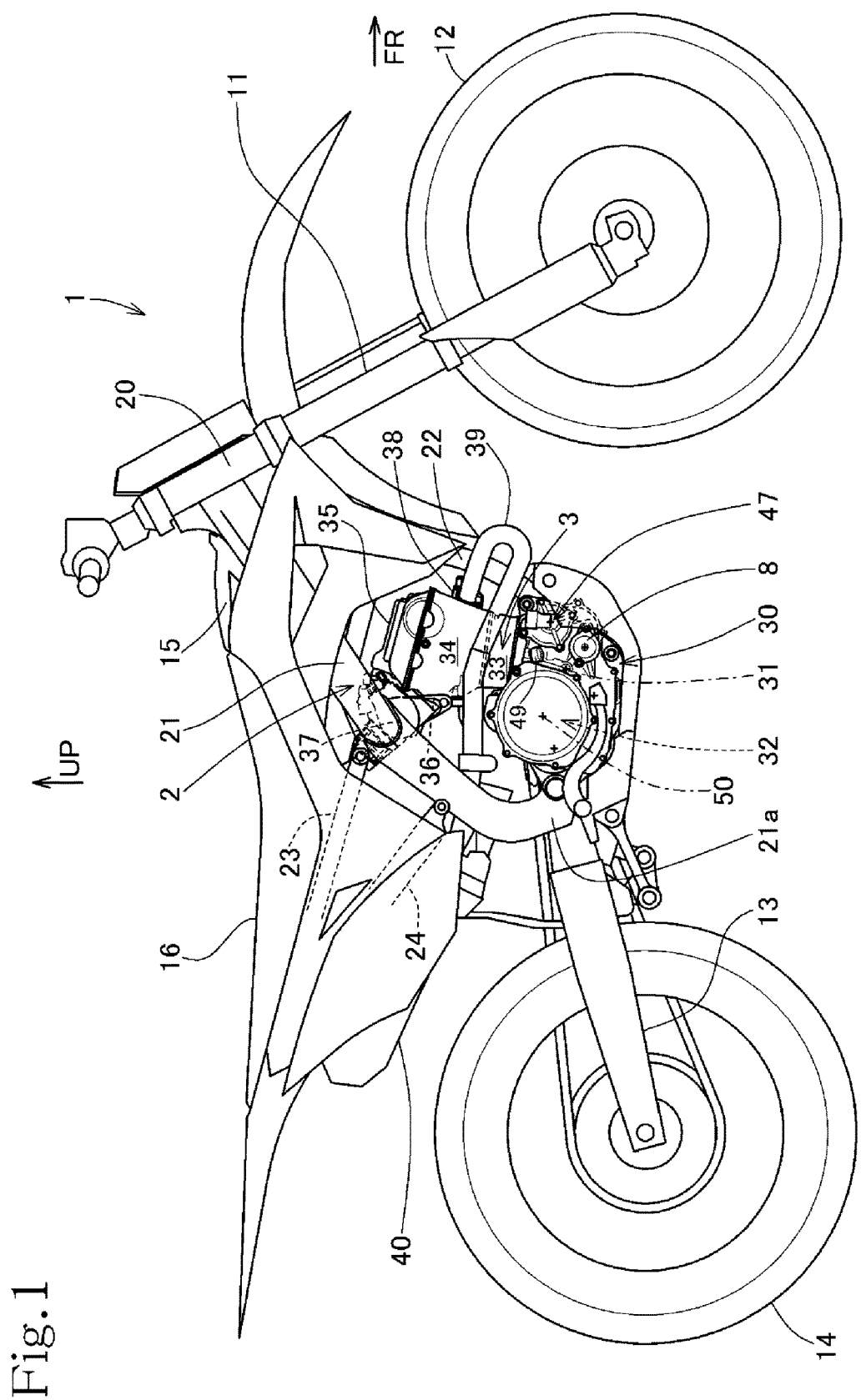
FIG. 1 is a right-hand side elevational view of a motorcycle provided with an oil filter attaching structure according to an embodiment of the present invention.

FIGS. 1 through 10 illustrate the oil filter attaching structure of the vehicle-mounted internal combustion engine according to the present embodiment. FIG. 1 illustrates the motorcycle 1 in right-hand side elevation.

As illustrated in FIG. 1, the vehicle-mounted internal combustion engine, denoted by 3, includes a water-cooled single-cylinder four-valve WOHC four-stroke internal combustion engine having a crankcase 30 that houses a transmission 32 integrally in a rear portion thereof, providing a so-called power unit. An internal combustion engine 3 that is mounted on the motorcycle 1 has a crankshaft 31 directed in vehicle widthwise directions of the motorcycle 1, i.e., leftward and rightward directions thereof.

As illustrated in FIG. 1, the motorcycle 1 on which the internal combustion engine 3 is mounted has a vehicle body frame 2 including a pair of left and right main frame rods 21 extending rearward and slightly downward from a head pipe 20 and then gradually bent downward toward rear ends 21a thereof.

A down frame 22 extends obliquely downward at a sharp angle from the head pipe 20.

A pair of left and right seat rails 23 extend rearwardly from intermediate portions of the respective left and right main frame rods 21, and are supported by a pair of respective left and right back stays 24 that interconnect central portions of the seat rails 23 and lower portions of the main frame rods 21.

In such a vehicle frame 2, a front fork 11 is angularly movably supported by the head pipe 20, and a front wheel 12 is rotatably supported on the lower end of the front fork 11.

A rear fork 13 has a front end angularly movably supported on the rear ends 21a of the main frame rods 21, and extends rearward with a rear wheel 14 rotatably supported on the rear end thereof. A rear cushion, not illustrated, is interposed between the rear fork 13 and the main frame rods 21.

A fuel tank 15 is mounted on front portions of the main frame rods 21, and a rider's seat 16 is supported on the seat rails 23 behind the fuel tank 15.

Figure 2:
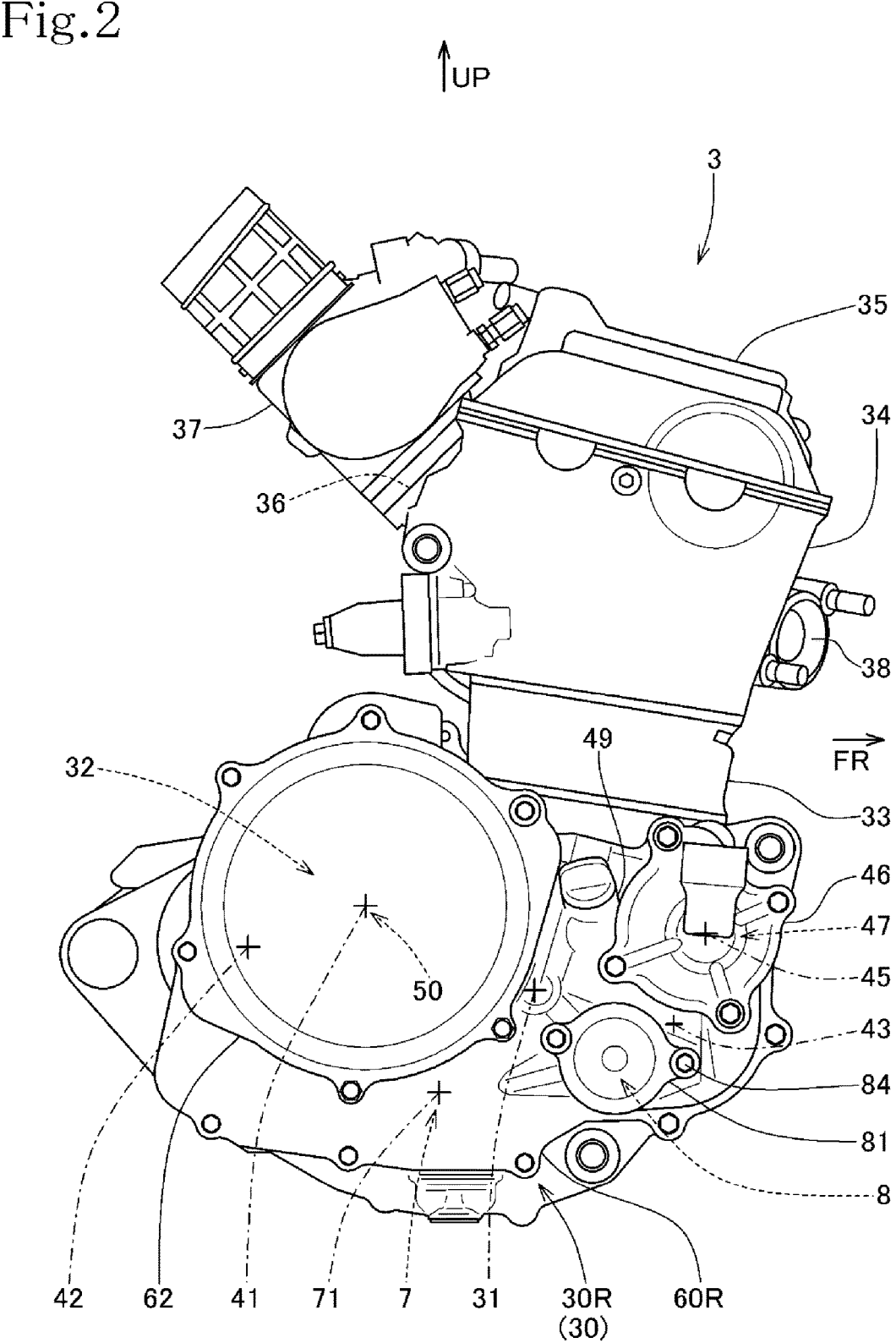
FIG. 2 is a right-hand side elevational view of an internal combustion engine on the motorcycle illustrated in FIG. 1.

The internal combustion engine 3 integrally combined with the transmission 32 as described above is suspended from the main frame rods 21 and the down frame 22. As illustrated in FIG. 2, the internal combustion engine 3 includes a cylinder block 33 and a cylinder head 34 stacked on and fastened to the crankcase 30 with a cylinder axis slightly tilted forward and fastened thereto, and a cylinder head cover 35 mounted on the upper end of the cylinder head 34. The internal combustion engine 3 is suspended in an upstanding orientation from the main frame rods 21 and the down frame 22.

An intake port 36 is open in a rear portion of the cylinder head 34 of the engine 3 and is connected to a throttle body 37 (see FIG. 2) that extends to an air cleaner, not illustrated, disposed below the rider's seat 16.

Two exhaust ports 38 that are spaced horizontally from each other as left and right exhaust ports are open forwardly from the cylinder head 34 (only the right exhaust port 38 is illustrated in FIG. 2). As illustrated in FIG. 1, exhaust pipes 39 are connected to the respective exhaust ports 38 and bent sideways to the left and right. The exhaust pipes 39 extend rearward on the left and right sides of the cylinder block 33 of the engine 3 and are connected to left and right mufflers 40 (only the right muffler 40 is illustrated in FIG. 1) above the rear wheel 14.

FIG. 2 is a right-hand side elevational view of the internal combustion engine 3 on the motorcycle 1 illustrated in FIG. 1.

Figure 9:
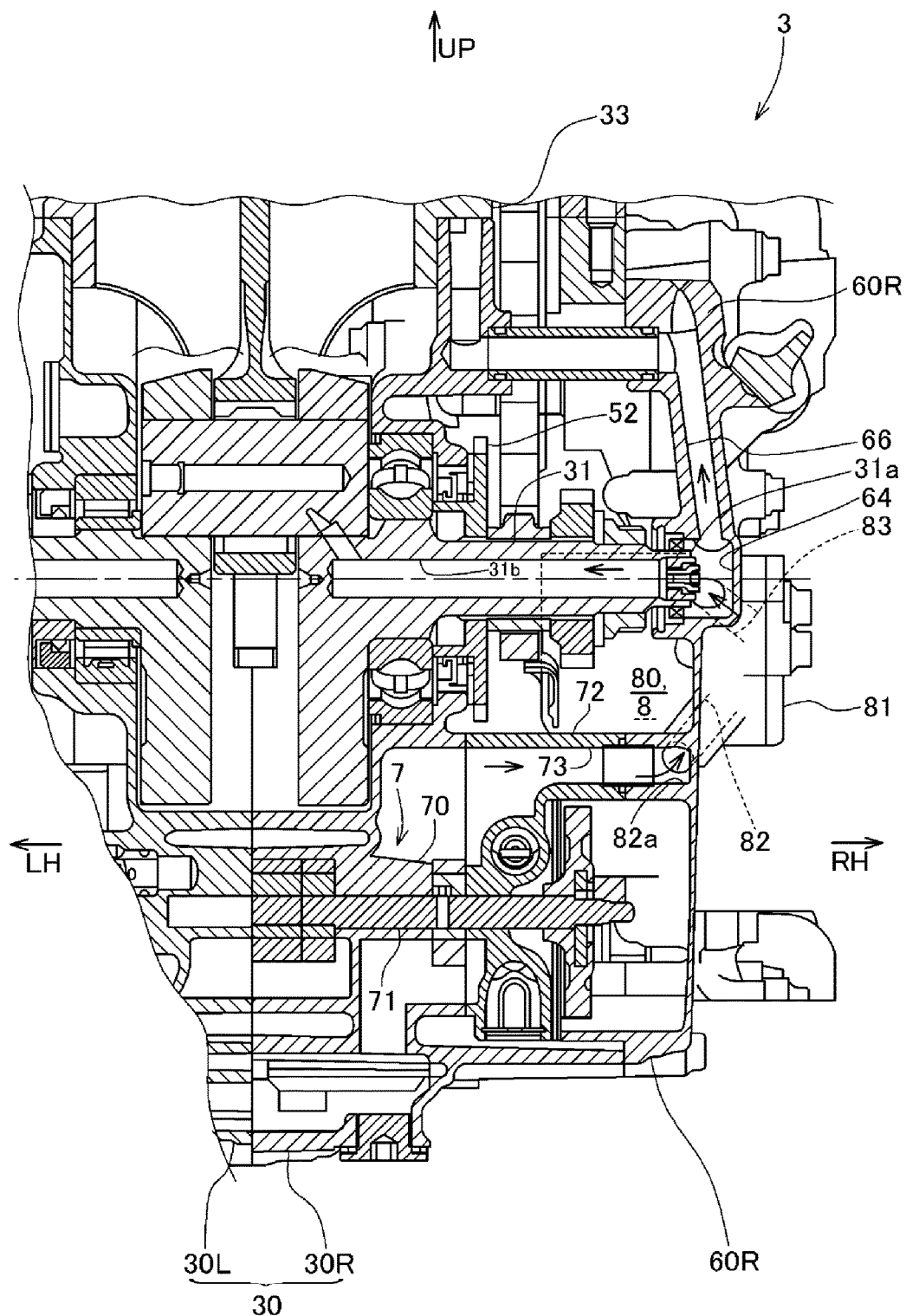
FIG. 9 is a fragmentary cross-sectional developed view taken generally along line IX-IX of FIG. 8, illustrating the internal combustion engine.
Figure 10:
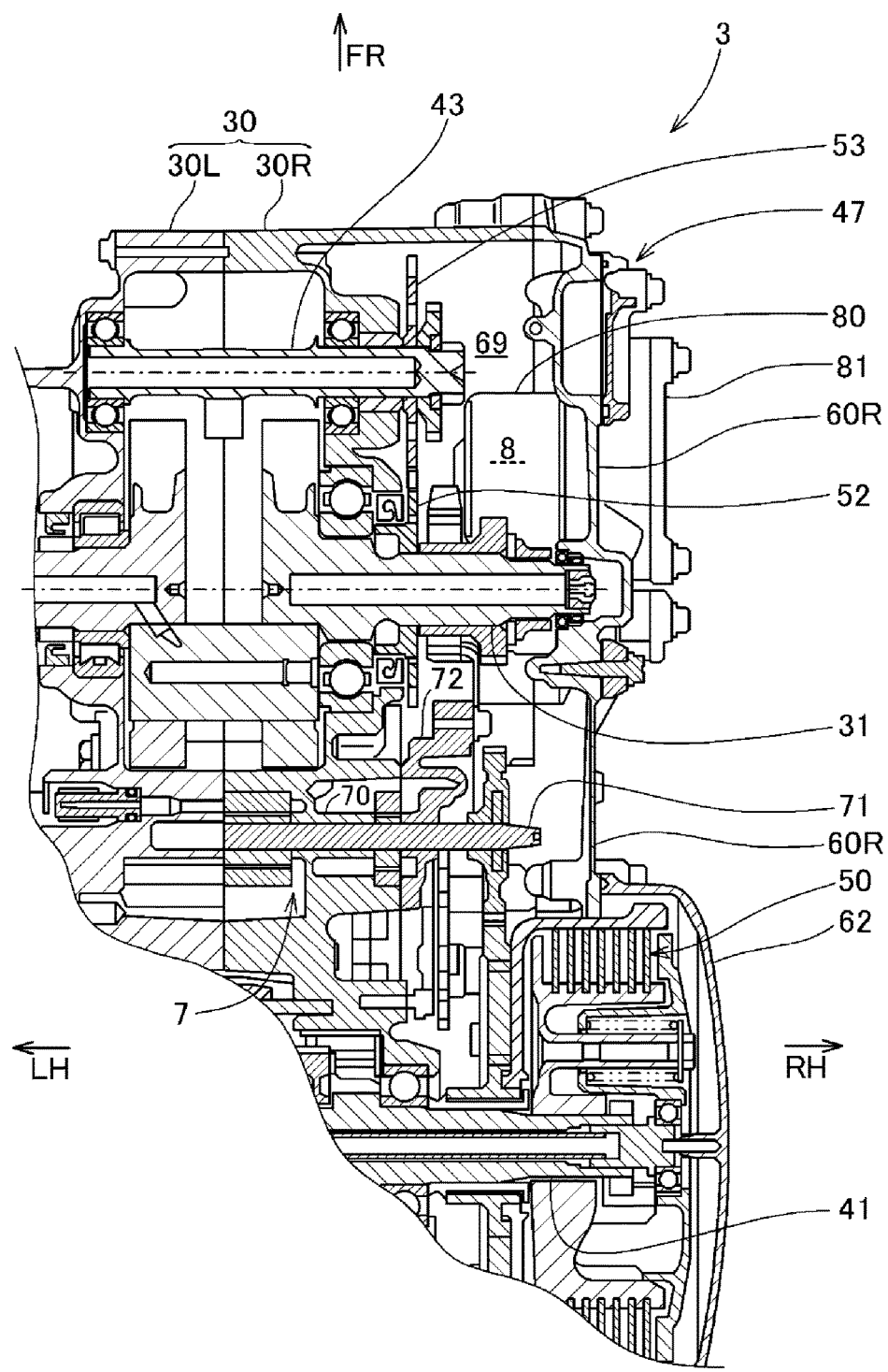
FIG. 10 is a fragmentary cross-sectional developed view taken generally along line X-X of FIG. 8, illustrating the internal combustion engine.

The crankcase 30 of the engine 3 includes a pair of left and right crankcase members 30L and 30R that are separably joined to each other (see FIGS. 9 and 10). FIG. 2 illustrates crosshair marks representing the central axes of the crankshaft 31, a main shaft 41 and a countershaft 42 of the transmission 32, a balancer shaft 43, an oil pump shaft 71, and a coolant pump shaft 45 that are supported in the crankcase 30 parallel to the crankshaft 31.

The main shaft 41 and the countershaft 42 are positioned behind the crankshaft 31, the balancer shaft 43 and the coolant pump shaft 45 are positioned in front of the crankshaft 31, and the oil pump shaft 71 is positioned below the crankshaft 31.

The right crankcase member 30R has a right side surface to which there is fastened a right crankcase cover 60R (see FIG. 9) in covering relation to the right end of the crankshaft 31 and to the positions of the respective shafts 31, 41, 42, 43, 44, and 45.

A clutch device 50 (see FIG. 10) is mounted coaxially on the right end of the main shaft 41. The right crankcase cover 60R has a clutch opening 61 (see FIG. 3) in a rear portion thereof through which the clutch device 50 is inserted. The clutch device 50 is disposed inside of the right crankcase cover 60R, and a clutch cover 62 is fastened to the right crankcase cover 60R in covering relation to the right side of the clutch device 50.

A coolant pump 47 that serves as an internal combustion engine accessory is disposed inside of a front portion of the right crankcase cover 60R, and a water pump cover 46 is attached to the front portion of the right crankcase cover 60R.

The right crankcase cover 60R has an oil supply port 49 (see FIG. 2) defined therein above the crankshaft 31 and between the clutch device 50 and the coolant pump 47.

Figure 3:
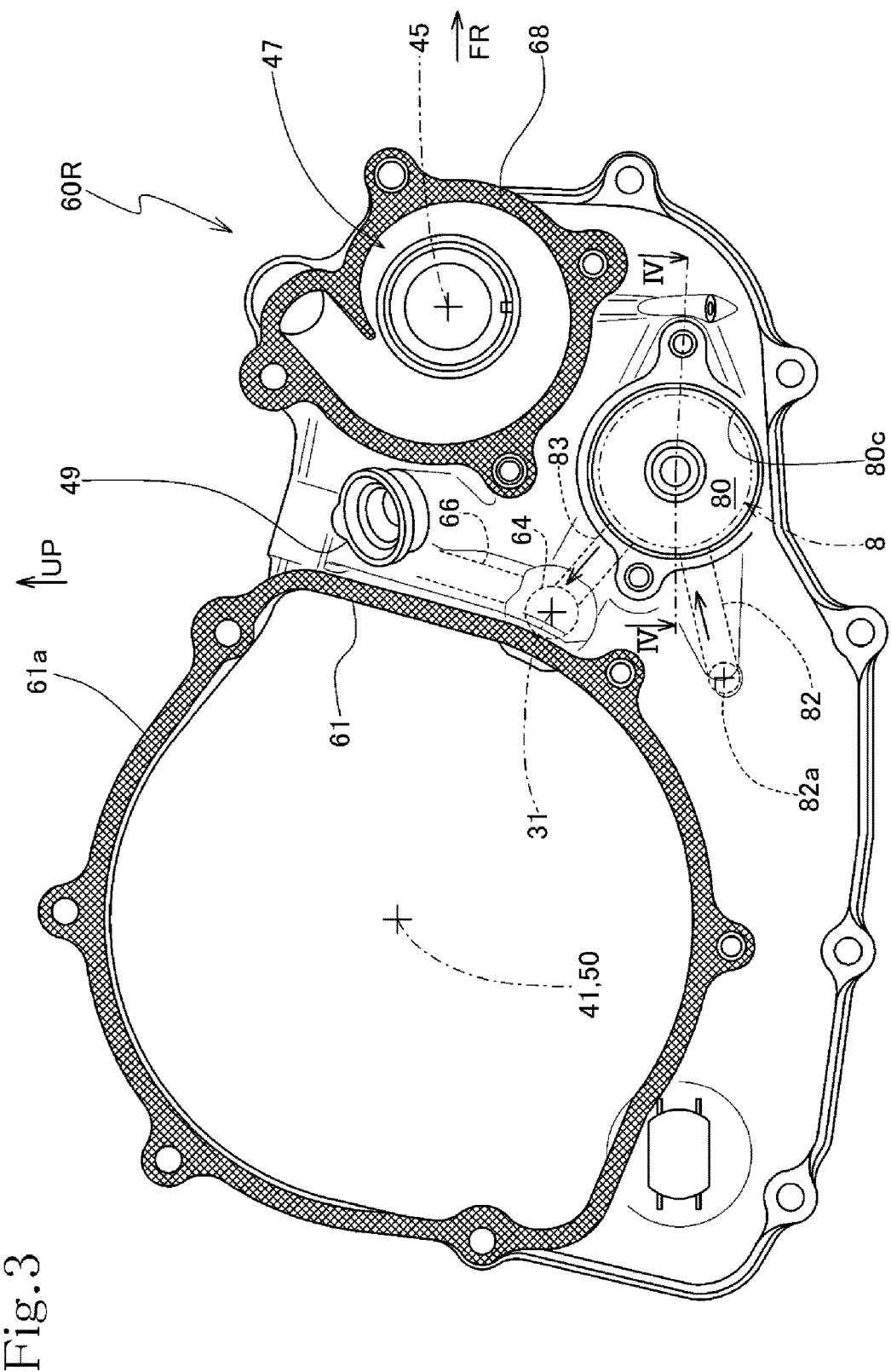
FIG. 3 is a right-hand side elevational view of a right crankcase cover of the engine illustrated in FIG. 2.

FIG. 3 illustrates a right outer surface of the right crankcase cover 60R. As illustrated in FIG. 3, the right crankcase cover 60R has a water pump cover mating surface 68 on its front portion for installing the water pump cover 46 thereon. The right crankcase cover 60R also has the clutch opening 61 in its rear portion and a clutch cover mating surface 61a around the clutch opening 61 in its rear portion for fastening the clutch cover 62 thereto. An oil filter 8 is provided below the crankshaft 31 substantially intermediate between the water pump cover mating surface 68 and the clutch cover mating surface 61a.

The oil filter 8 is housed in a storage cavity 80 having a bottomed tubular shape defined as an oil filter case in the right crankcase cover 60R and extending toward the center of the vehicle along the axis of the crankshaft 31, and a cap 81 (see FIG. 2) covers the opening of the storage cavity 80.

Figure 4:
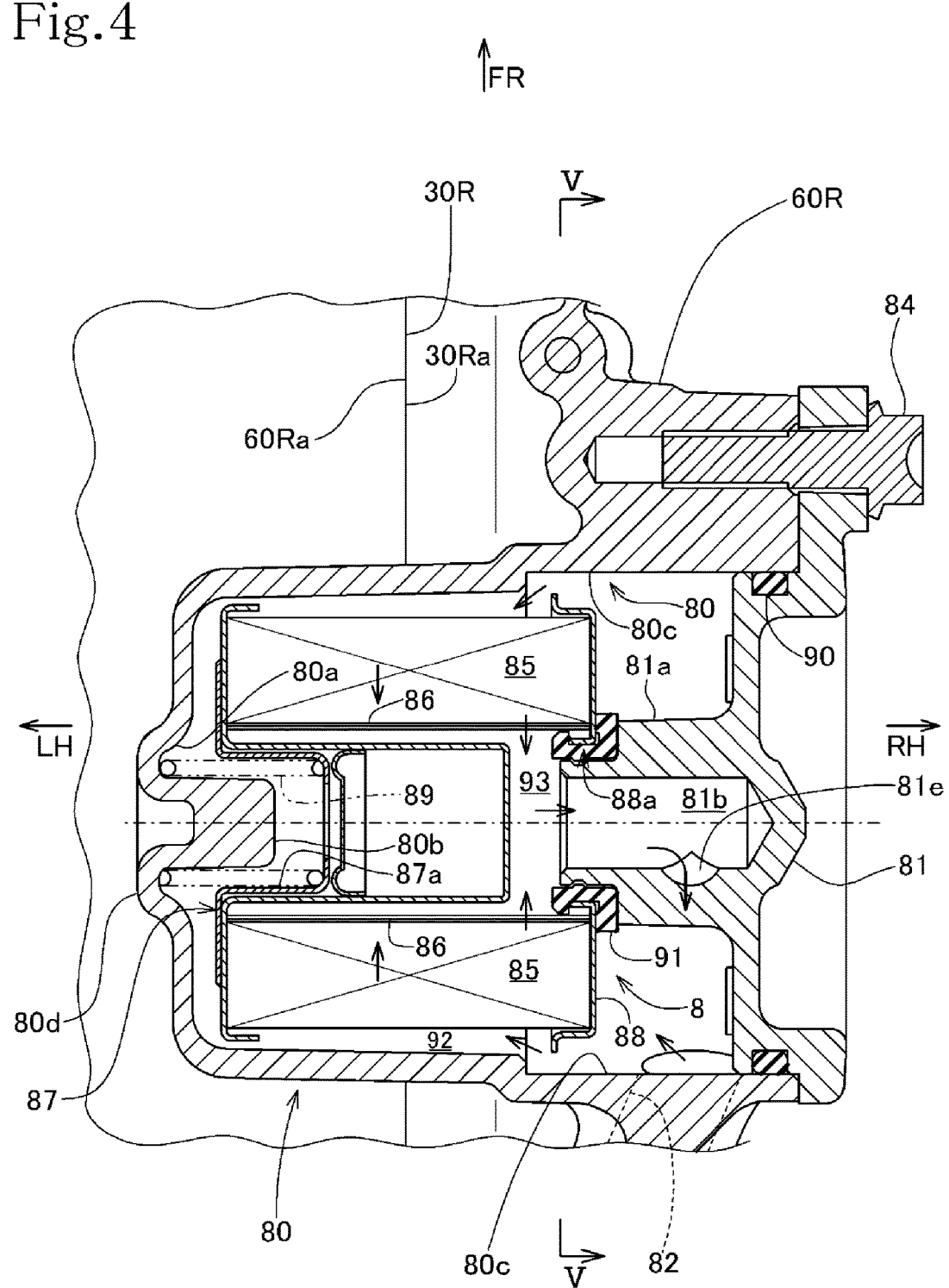
FIG. 4 is a cross-sectional view taken along line IV-IV of FIG. 3 and line IV-IV of FIG. 5(a), illustrating in cross section a storage cavity, an oil filter housed in the storage cavity, and a cap.

FIG. 4 is a cross-sectional view taken along line IV-IV of FIG. 3 and line IV-IV of of FIG. 5 (a), illustrating in cross section the storage cavity 80, the oil filter 8 housed in the storage cavity 80, and the cap 81.

Since the storage cavity 80 serves as an oil filter case, the cap 81 is positioned closely to the center of the internal combustion engine 3 and prevented from protruding from the right crankcase cover 60R. Therefore, even the vehicle-mounted internal combustion engine 3 which is small in size provides a space for the oil filter 8, and has its width reduced.

The right crankcase cover 60R has an inlet oil passage 82, as a first oil passage, defined in a wall thereof along an inner wall surface thereof for guiding oil from an oil pump 7, to be described later, to the oil filter 8, and an outlet oil passage 83 (see FIG. 3), as a second oil passage, defined in the wall thereof along the inner wall surface thereof for guiding oil from the oil filter 8 to an oil reservoir 64 connected to a right axial end 31a (see FIG. 9) of the crankshaft 31, the inlet oil passage 82 and the outlet oil passage 83 having respective ends that are open at an inner circumferential surface 80c (see FIG. 3) of the storage cavity 80.

Inasmuch as the coolant pump 47 as an internal combustion engine accessory and the clutch device 50 are disposed inside of the right crankcase cover 60R in respective positions forwardly and rearwardly facing the crankshaft 31, and the oil supply port 49 and the oil filter 8 are also disposed inside of the right crankcase cover 60R in respective positions above and below the crankshaft 31, these devices and components are distributed around the crankshaft 31. Therefore, the right side surface of the internal combustion engine 3 is efficiently utilized for making itself smaller in size and for better maintainability. The coolant pump 47 may be replaced with another internal combustion engine accessory.

Inasmuch as the inlet oil passage 82 and the outlet oil passage 83 that are connected to the storage cavity 80 do not extend parallel to the crankshaft 31, but are defined in the wall of the right crankcase cover 60R along the inner wall surface thereof, no space for defining oil passages therein is required along the axis of the crankshaft 31. Therefore, the oil filter 8 is positioned closely to the crankshaft 31, allowing the internal combustion engine 3 to be reduced in size.

As illustrated in FIG. 4, the oil filter 8 includes an assembly of a filter element 85 having an annular or cylindrical shape, an oil-permeable tube 86 fitted in the internal space of the filter element 85, and a bottom stiffening plate 87 and an opening stiffening plate 88 that are fitted over the opposite ends of the filter element 85 and the oil-permeable tube 86, the assembly being housed in the storage cavity 80.

The oil filter 8 is normally biased toward the cap 81 by a helical spring 89 placed in the storage cavity 80. One end of the helical spring 89 is fitted over and positioned by a central cylindrical guide boss 80b formed on an inner bottom surface 80a of the storage cavity 80. The other end of the helical spring 89 is inserted in a spring housing recess 87a defined centrally in the bottom stiffening plate 87.

When the oil filter 8 is placed into and removed from the storage cavity 80, the helical spring 89 is prevented from being moved or dislodged off by the guide boss 80b. As the helical spring 89 is thus positioned securely with ease, the oil filter 8 can be assembled and disassembled efficiently.

The cap 81 is mounted on the right crankcase cover 60R and has its outer circumferential surface 81c (see FIG. 5 (a)) held against the inner circumferential surface 80c of the storage cavity 80 with a seal 90 interposed therebetween. The cap 81 is fastened to the right crankcase cover 60R by bolts 84. The cap 81 has an outlet boss 81a having a tubular shape formed on a central inner surface thereof and projecting into the storage cavity 80, the outlet boss 81a being open into the storage cavity 80. The space in the outlet boss 81a is referred to as an inner cap central space 81b.

The opening stiffening plate 88 of the oil filter 8 has a central opening 88a defined therein which is fitted over the outlet boss 81a of the cap 81 with a seal 91 interposed therebetween.

FIG. 5 (a) is a view taken along line V-V of FIG. 4, illustrating the cap 81 only, and FIG. 5 (b) is a cross-sectional view taken along line b-b of FIG. 5 (a). It is to be noted that the cross-sectional view of the cap 81 in FIG. 4 corresponds to the cross sectional view taken along line IV-IV in FIG. 5 (a).

As illustrated in FIGS. 5 (a) and (b), the cap 81 includes a bulge 81d formed to extend to the inner surface 80c of the storage cavity 80 and extending radially outwardly from the outlet boss 81a to the outer circumferential surface 81c of the cap 81. The bulge 81d defines therein an inner cap oil passage 81e extending radially outward from the inner cap central space 81b in the outlet boss 81a to the outer circumferential surface 81c of the cap 81 where the inner cap oil passage 81e is open. When the cap 81 is fitted in the storage cavity 80, the inner cap oil passage 81e is aligned with the outlet oil passage 83 and held in fluid communication therewith.

The space in the storage cavity 80 is divided into a peripheral space 92 and a central space 93 by the oil filter 8 positioned in the storage cavity 80 by the cap 81.

The peripheral space 92 is held in fluid communication with an end of the inlet oil passage 82 that is defined in the inner wall surface of the right crankcase cover 60R. The central space 93 is held in fluid communication with an end of the outlet oil passage 83 through an L-shaped oil passage that includes the inner cap central space 81b and the inner cap oil passage 81e in the cap 81.

Consequently, both the inlet oil passage 82 and the outlet oil passage 83 for the oil filter 8 are disposed in a planar layout in the wall of the right crankcase cover 60R along the inner wall surface thereof, and are hence prevented from protruding from the right crankcase cover 60R.

Figure 6:
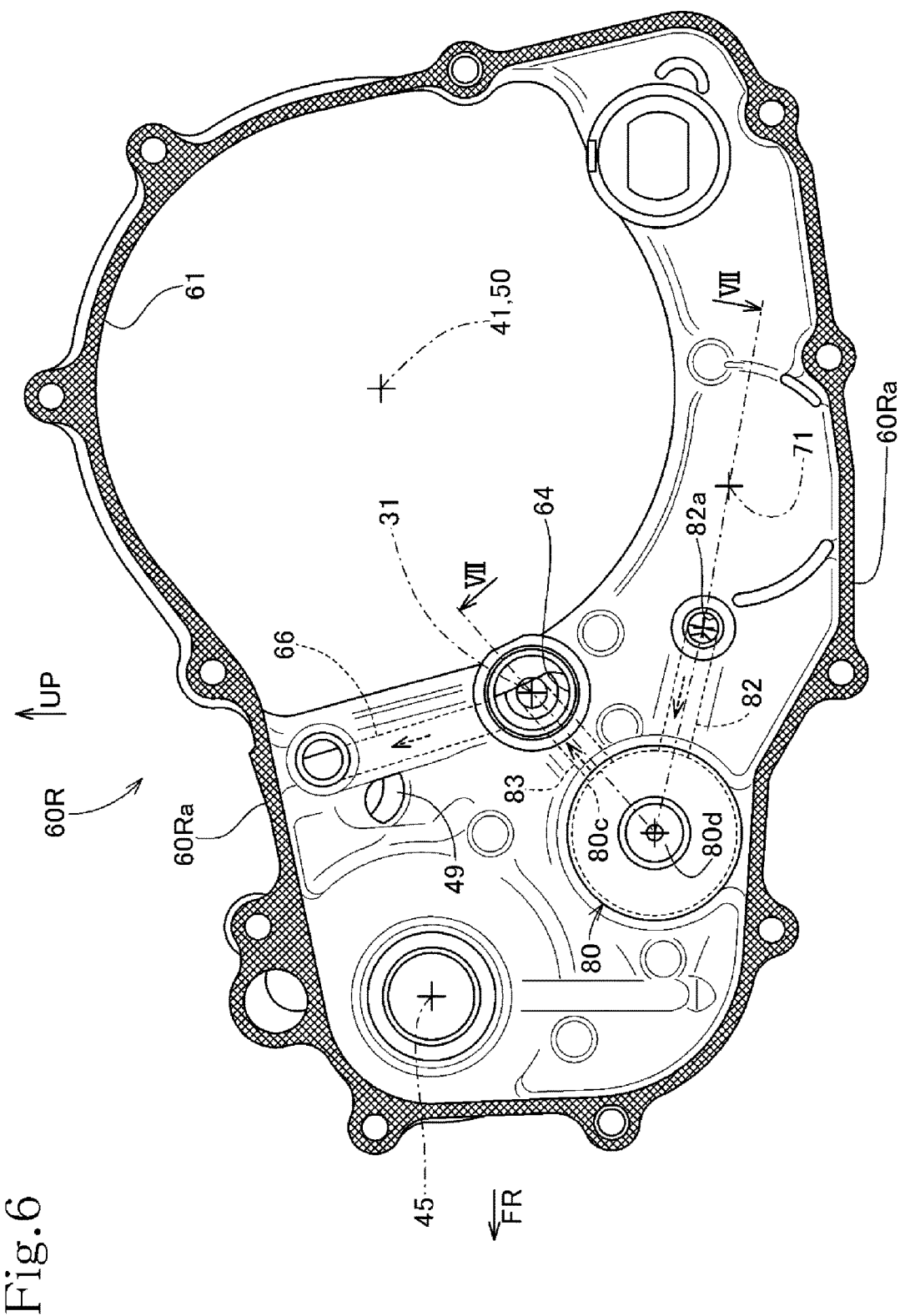
FIG. 6 is a left-hand side elevational view illustrating an inner wall surface of the right crankcase cover illustrated in FIG. 3.

FIG. 6 is a left-hand side elevational view illustrating the inner wall surface of the right crankcase cover 60R illustrated in FIG. 3. The right crankcase cover 60R has a mating surface 60Ra extending around the inner wall surface thereof for being mated to the right crankcase member 30R. The storage cavity 80 has an outer bottom surface 80d protruding forward and downward of the clutch opening 61.

The inlet oil passage 82 that is defined in the inner wall surface of the right crankcase cover 60R extends slightly downward and rearward (to the right in FIG. 6) from the storage cavity 80. The inlet oil passage 82 has an end, remote from the storage cavity 80, that serves as a joint opening 82a connected to a pump outlet port 73 (see FIG. 9) of the oil pump 7.

The outlet oil passage 83 that is defined in the inner wall surface of the right crankcase cover 60R extends obliquely upward and rearward (to the right in FIG. 6) from the storage cavity 80. The outlet oil passage 83 has an end, remote from the storage cavity 80, into which the right end 31a (see FIG. 9) of the crankshaft 31 is inserted in a fluid-tight manner, where the oil reservoir 64 for supplying oil to an inner shaft oil passage 31b defined in the crankshaft 31 is defined.

A branched oil passage 66 is defined in the inner wall surface of the right crankcase cover 60R and extends slightly forward and upward from the oil reservoir 64, providing an oil supply channel directed to the cylinder head 34, etc.

Figure 7:
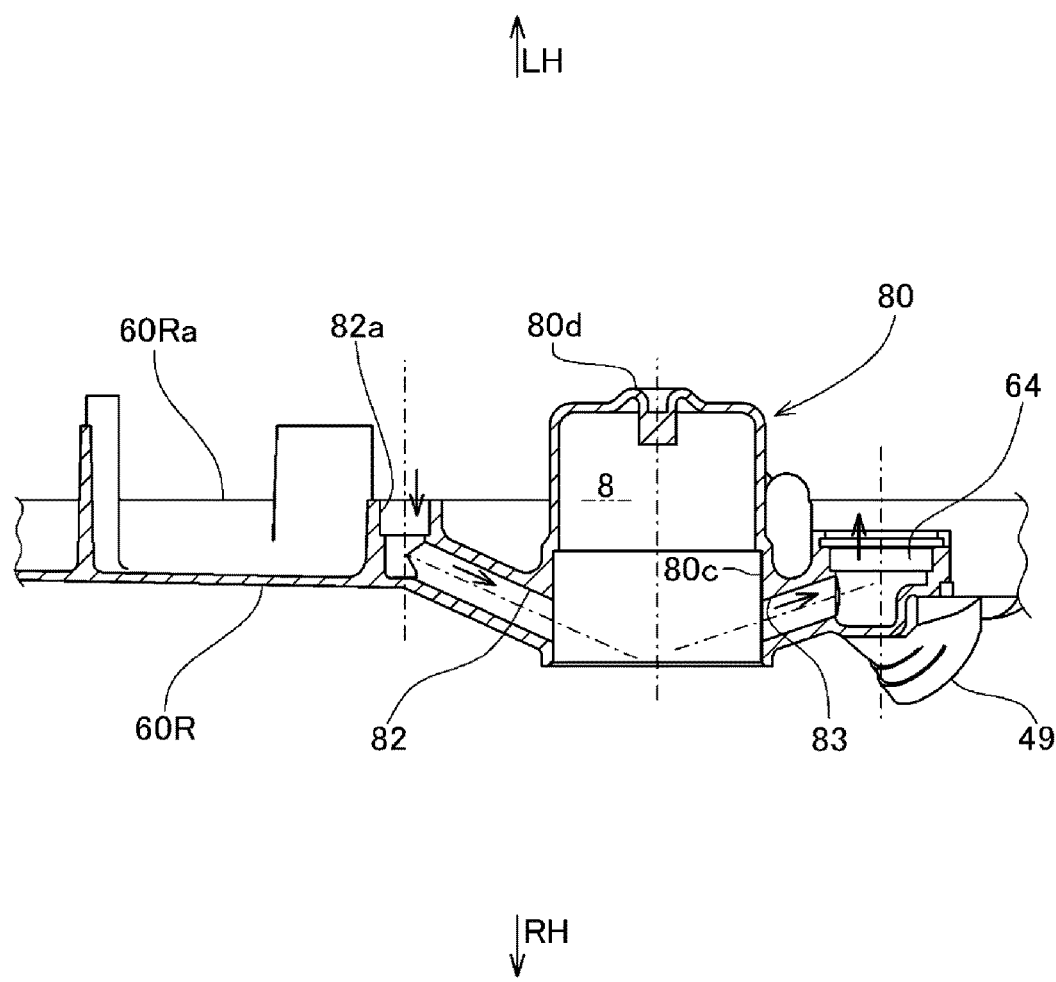
FIG. 7 is a cross-sectional view of the right crankcase cover, taken along line VII-VII of FIG. 6.

FIG. 7 is a cross-sectional view of the right crankcase cover 60R, taken along line VII-VII of FIG. 6, illustrating in cross section the joint opening 82a, the inlet oil passage 82, the storage cavity 80, the outlet oil passage 83, and the oil reservoir 64.

As illustrated in FIG. 7, the inlet oil passage 82 and the outlet oil passage 83 for the oil filter 8 housed in the storage cavity 80 do not extend parallel to the crankshaft 31, but are defined in the planer layout in the wall of the right crankcase cover 60R along the inner wall surface thereof, as described above.

Therefore, as explained above, no space for defining oil passages therein is required along the axis of the crankshaft 31, so that the oil filter 8 is positioned closely to the crankshaft 31, allowing the internal combustion engine 3 to be reduced in size.

As illustrated in FIG. 7, the outer bottom surface 80d of the storage cavity 80 projects toward the right crankcase member 30R beyond the mating surface 60Ra of the right crankcase cover 60R for being mated to the right crankcase member 30R.

When the right crankcase cover 60R is removed from the right crankcase member 30R and placed on a tray for temporarily putting component elements thereon, with the mating surface 60Ra of the right crankcase cover 60R facing down, the mating surface 60Ra is kept off the surface of the tray. As the mating surface 60Ra is kept out of contact with the surface of the component element tray, the mating surface 60Ra is prevented from being damaged and has its serviceability increased.

Figure 8:
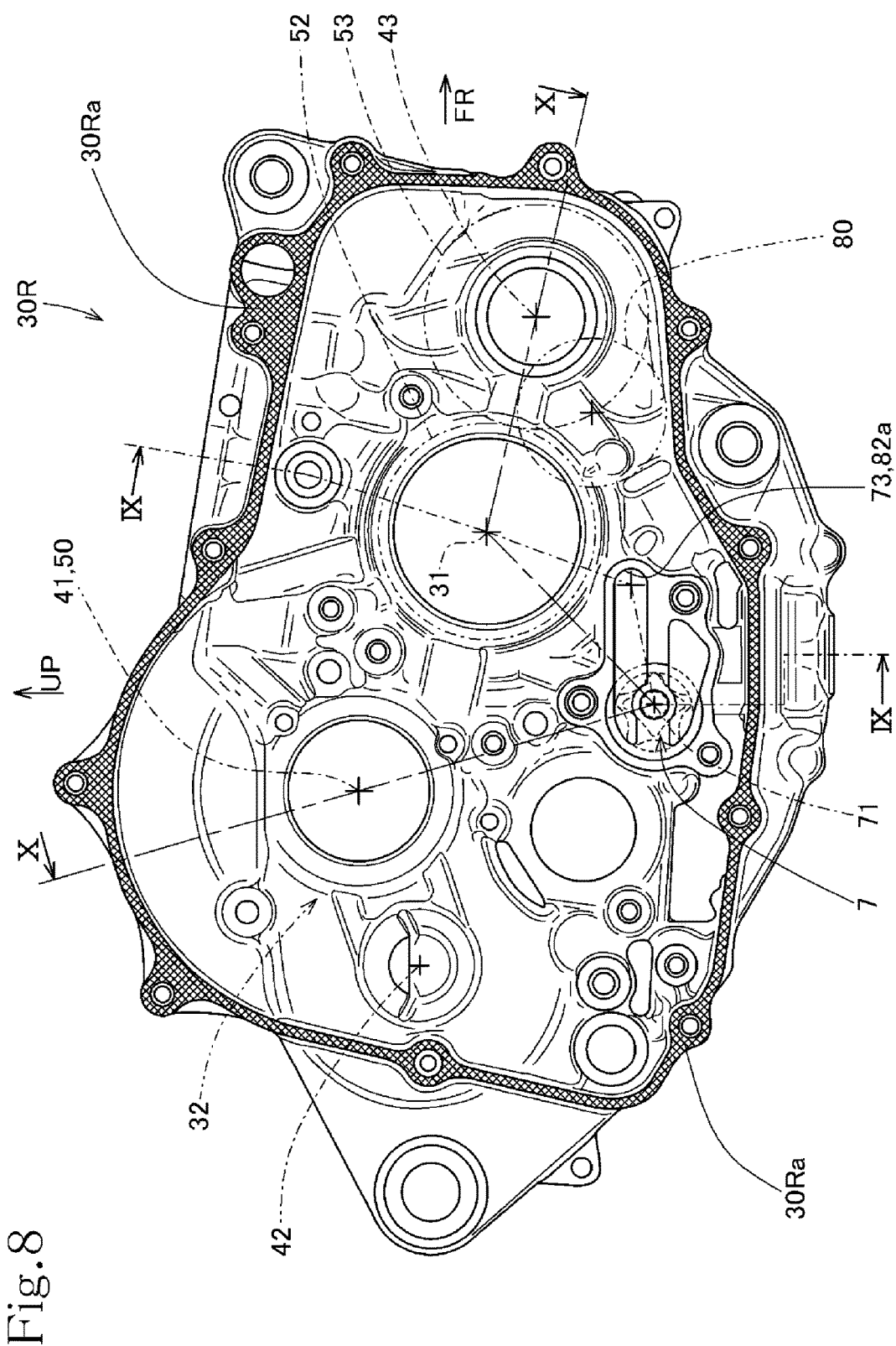
FIG. 8 is a right-hand side elevational view illustrating an outer wall surface of a right crankcase member.

FIG. 8 is a right-hand side elevational view illustrating an outer wall surface of the right crankcase member 30R. FIG. 8 illustrates crosshair marks representing the central axes of the crankshaft 31, the main shaft 41 and the countershaft 42 of the transmission 32, the balancer shaft 43, and the oil pump shaft 71, these shafts being positioned inside of the area surrounded by a mating surface 30Ra for being mated to the right crankcase cover 60R.

The oil pump 7 has a pump body 70 (see FIG. 9) formed on the right crankcase member 30R around the oil pump shaft 71. A pump outer case 72 (see FIG. 9) is mounted on the pump body 70 in covering relation thereto.

In FIG. 8, a large-diameter balancer drive gear 52 is mounted on the crankshaft 31, and a large-diameter balancer driven gear 53 is mounted on the balancer shaft 43 that lies parallel to the crankshaft 31. The balancer drive gear 52 and the balancer driven gear 53 have the same pitch circle radius as each other, dividing the inter-axis distance between the crankshaft 31 and the balancer shaft 43 into equal distances, and are held in mesh with each other.

Specifically, the internal combustion engine 3 includes the balancer drive gear 52 and the balancer driven gear 53, which are supported by the crankcase 30 with their respective axes parallel to the crankshaft 31 and held in mesh with each other, on the same side as the end 31a of the crankshaft 31 (see FIGS. 9 and 10).

When the right crankcase cover 60R is mounted on the right crankcase member 30R, the storage cavity 80 of the right crankcase cover 60R is positioned at the location indicated by the two-dot-and-dash line in FIG. 8.

FIG. 9 is a fragmentary cross-sectional developed view taken generally along line IX-IX of FIG. 8, illustrating the internal combustion engine 3.

As illustrated in FIG. 9, the pump outer case 72 mounted on the pump body 70 of the oil pump 7 in covering relation thereto has the pump outlet port 73 connected to the joint opening 82a of the inlet oil passage 82 defined in the inner wall surface of the right crankcase cover 60R. Therefore, oil discharged from the oil pump 7 is delivered to the oil filter 8 in the storage cavity 80.

Oil that has passed through the oil filter 8 in the storage cavity 80 flows through the outlet oil passage 83 defined in the inner wall surface of the right crankcase cover 60R into the oil reservoir 64. Then, the oil flows from the right end 31a of the crankshaft 31 inserted in a fluid-tight manner in the oil reservoir 64 into the inner shaft oil passage 31b defined in the crankshaft 31.

The oil is also delivered from the oil reservoir 64 through the branched oil passage 66 defined upward in the inner wall surface of the right crankcase cover 60R, and supplied to lubricate and cool various components in the cylinder head 34, etc.

FIG. 10 is a fragmentary cross-sectional developed view taken generally along line X-X of FIG. 8, illustrating the internal combustion engine 3.

As illustrated in FIG. 10, the balancer shaft 43 is supported by the crankcase 30 parallel to and forwardly of the crankshaft 31. The balancer drive gear 52 is mounted on the right end 31a of the crankshaft 31, and the balancer driven gear 53, which is of the same pitch circle radius as the balancer drive gear 52, is mounted on a right end of the balancer shaft 43 adjacent to the right crankcase member 30R. The balancer drive gear 52 and the balancer driven gear 53 are held in mesh with each other.

As illustrated in FIG. 8, the storage cavity 80 of the right crankcase cover 60R is disposed in a position overlapping the balancer drive gear 52 and the balancer driven gear 53 as viewed along the axis of the crankshaft 31.

Therefore, as illustrated in FIG. 10, the storage cavity 80 is placed in a space 69 at the axial ends of the large-diameter balancer gear train, i.e., the balancer drive gear 52 and the balancer driven gear 53, disposed on the same side as the end 31a of the crankshaft 31 and extending parallel to the crankshaft 31. The space on one side of the internal combustion engine 3 is thus effectively utilized, and the engine 3 has no outwardly protrusive structure for installing the oil filter 8 therein, allowing the internal combustion engine 3 to be reduced in size.

The balancer drive gear 52 may be mounted on another shaft that lies parallel to the crankshaft 31 and is rotatable at the same speed as the crankshaft 31.

The oil filter attaching structure according to the embodiment of the present invention has been described above. The present invention is not limited to the illustrated embodiment, but various changes and modifications may be made to the embodiment without departing from the scope of the invention. For example, the vehicle-mounted internal combustion engine is not limited to the internal combustion engine illustrated in the above embodiment, but may be other types of internal combustion engine, and the vehicle is not limited to the motorcycle illustrated in the above embodiment, but may be other types of vehicle including three- or four-wheeled buggies.

In the above embodiment, the internal combustion engine has been described as having the illustrated layout in the leftward and rightward directions for illustrative purposes. However, the present invention covers internal combustion engines having other different layouts in the leftward and rightward directions.

DESCRIPTION OF REFERENCE SYMBOLS

1 . . . Motorcycle, 3 . . . Internal combustion engine, 7 . . . Oil pump, 8 . . . Oil filter, 30 . . . Crankcase, 30R . . . Right crankcase member, 30Ra . . . Mating surface, 31 . . . Crankshaft, 31a . . . Right end, 31b . . . Inner shaft oil passage, 32 . . . Transmission, 33 . . . Cylinder block, 34 . . . Cylinder head, 41 . . . Main shaft, 42 . . . Countershaft, 43 . . . Balancer shaft, 43a . . . Right end, 44 . . . Oil pump shaft, 49 . . . Oil supply port, 50 . . . Clutch device, 52 . . . Balancer drive gear, 53 . . . Balancer driven gear, 60R . . . Right crankcase cover, 60Ra . . . Mating surface, 64 . . . Oil reservoir, 66 . . . Branched oil passage, 70 . . . Pump body, 71 . . . Oil pump shaft, 72 . . . Pump outer case, 73 . . . Pump outlet port, 80 . . . Storage cavity, 80a . . . Inner bottom surface, 80b . . . Guide boss, 80c . . . Inner circumferential surface, 80d . . . Outer bottom surface, 81 . . . Cap, 81a . . . Outlet boss, 81b . . . Inner cap central space, 81c . . . Outer circumferential surface, 81d . . . Bulge, 81e . . . Inner cap oil passage, 82 . . . Inlet oil passage ("first oil passage" according to the present invention), 83 . . . Outlet oil passage ("second oil passage" according to the present invention), 85 . . . Filter element, 86 . . . Oil-permeable tube, 87 . . . Bottom stiffening plate, 87a . . . Spring housing recess, 88 . . . Opening stiffening plate, 88a . . . Central opening, 89 . . . Helical spring, 90 . . . Seal, 91 . . . Seal, 92 . . . Peripheral space, 93 . . . Central space

The invention claimed is:

1. An oil filter attaching structure for a vehicle-mounted internal combustion engine, in which the internal combustion engine has an oil filter installed in a filter case integrally formed with a crankcase cover of a crankcase, wherein:

said crankcase cover is mounted on a side surface of said crankcase so as to cover an end of a crankshaft supported by said crankcase so as to extend in vehicle widthwise directions;

an internal combustion engine accessory and a clutch device of an engine transmission are disposed inside of said crankcase cover in respective positions forward and rearward of said crankshaft; and said oil filter and an oil supply port are disposed in said crankcase cover in respective positions upward and downward of said crankshaft, a branched oil passage is provided in said crankcase cover to conduct oil, which has flowed through the oil filter, into a cylinder head of the engine, the branched oil passage extending between said internal combustion engine accessory and said clutch device so as to be in overlapping relation with said oil supply port, as viewed in a side view.

2. The oil filter attaching structure for a vehicle-mounted internal combustion engine according to claim 1, wherein said filter case includes therein a storage cavity having a bottomed tubular shape defined in said crankcase cover and extending toward a center region of the vehicle in a direction along said crankshaft; and said oil filter is housed in said storage cavity with a cap covering said storage cavity.

3. The oil filter attaching structure for a vehicle-mounted internal combustion engine according to claim 2, wherein a first oil passage and a second oil passage are provided in a wall of said crankcase cover along an inner wall surface thereof, so as to open at an inner circumferential surface of said storage cavity, said cap has an inner cap oil passage defined therein radially outward from an inner cap central space defined in said cap, and said inner cap oil passage is open at an outer circumferential surface of said cap and is in communication with said second oil passage.

4. The oil filter attaching structure for a vehicle-mounted internal combustion engine according to claim 3, wherein said oil filter is housed in said storage cavity so as to divide the space in the storage cavity into a peripheral space and a central space, said peripheral space is held in fluid communication with said first oil passage, and said central space is held in fluid communication with said second oil passage through said inner cap central space and said inner cap oil passage in said cap.

5. The oil filter attaching structure for a vehicle-mounted internal combustion engine according to claim 4, wherein said storage cavity has on an inner bottom surface thereof a cylindrical guide boss for positioning a helical spring for pressing said oil filter toward said cap.

6. The oil filter attaching structure for a vehicle-mounted internal combustion engine according to claim 3, wherein said storage cavity has on an inner bottom surface thereof a cylindrical guide boss for positioning a helical spring for pressing said oil filter toward said cap.

7. The oil filter attaching structure for a vehicle-mounted internal combustion engine according to claim 2, wherein said storage cavity has on an inner bottom surface thereof a cylindrical guide boss for positioning a helical spring for pressing said oil filter toward said cap.

8. The oil filter attaching structure for a vehicle-mounted internal combustion engine according to claim 7, wherein said storage cavity has an outer bottom surface which is of a shape protruding toward said crankcase beyond a mating surface of said crankcase cover for being mated to said crankcase.

9. The oil filter attaching structure for a vehicle-mounted internal combustion engine according to claim 7, wherein said internal combustion engine has a balancer drive gear and a balancer driven gear, which are supported by said crankcase with their respective axes parallel to said crankshaft and held in mesh with each other, on the same axial side as said end of said crankshaft; and said storage cavity of said crankcase cover is disposed in a position partly overlapping said balancer drive gear and said balancer driven gear as viewed in a direction along said crankshaft.

10. The oil filter attaching structure for a vehicle-mounted internal combustion engine according to claim 1, wherein the oil supply port is a lubricant oil supply port through which lubricant oil is supplied into the crankcase as a lubricant oil reservoir, and wherein the lubricant oil supply port is arranged above the crankshaft and between the engine accessory and the clutch device.

\* \* \* \* \*